United States Patent [19]
Henry et al.

[11] Patent Number: 5,339,107
[45] Date of Patent: Aug. 16, 1994

[54] COLOR OPTICAL SCANNER WITH ROTATING COLOR FILTER ASSEMBLY

[75] Inventors: Steven G. Henry, Fort Collins; Dean Buck; Jerry L. Bybee, both of Loveland, all of Colo.

[73] Assignee: Hewlett-Packard Company, Palo Alto, Calif.

[21] Appl. No.: 932,166

[22] Filed: Aug. 19, 1992

[51] Int. Cl.⁵ ............................................. H04N 1/04
[52] U.S. Cl. ................................................... 348/270
[58] Field of Search ................. 358/42, 505, 512, 515; 348/269, 270; H04N 1/04, 1/06

[56] References Cited

U.S. PATENT DOCUMENTS

| | | | |
|---|---|---|---|
| 2,880,267 | 3/1959 | Goldmark et al. | 358/42 |
| 3,970,383 | 7/1976 | Honda et al. | |
| 4,667,253 | 5/1987 | Chen. | |
| 4,709,144 | 11/1987 | Vincent | 250/226 |
| 4,760,427 | 7/1988 | Oyama et al. | |
| 4,809,062 | 2/1989 | Chen. | |
| 4,855,818 | 8/1989 | Morimoto et al. | 358/75 |
| 4,926,041 | 5/1990 | Boyd. | |
| 4,931,862 | 6/1990 | Nakao et al. | |
| 5,122,911 | 6/1992 | Kuo. | |

FOREIGN PATENT DOCUMENTS

| | | | |
|---|---|---|---|
| 1-147956 | 6/1989 | Japan | H04N 1/04 |
| 2-277374 | 11/1990 | Japan | H04N 1/04 |
| 4-81068 | 3/1992 | Japan | H04N 1/04 |

OTHER PUBLICATIONS

Takeuchi, R. et al. (1986) "Color Image Scanner with an RGB Linear Image Sensor" SPSE Conference, The Third International Congress On Advances in Non-Impact Printing Technologies, pp. 339–346, Aug. 1986.

Office action mailed Sep. 24, 1993 re German application No. P43 20 059.1–31 of Hewlett-Packard Co.

*Primary Examiner*—Mark R. Powell
*Assistant Examiner*—Cheryl Cohen

[57] ABSTRACT

A color optical scanner for generating data representative of a color image of an object which is scanned including: a linear sensor array located on an image plane for generating a data signal indicative of the intensity of light impinged thereon and having sensor sampling intervals of a predetermined length; an imaging assembly for imaging a moving scan area on the object containing a plurality of scan lines on an image plane and for defining an imaging light path extending from the scan area on the object to the image plane; a color wheel positioned along the imaging light path and having an axis of rotation extending transversely of the light path and having a plurality of faces adapted to be sequentially rotated into intersecting relationship with the light path; a plurality of the faces including a plurality of filter portions of different spectral range transmissibility which are sequentially rotated into intersecting relationship with the light path during different color imaging intervals having durations equal to the sensor sampling interval.

13 Claims, 7 Drawing Sheets

COLOR OPTICAL SCANNER WITH ROTATING COLOR FILTER ASSEMBLY

BACKGROUND OF THE INVENTION

The present invention relates generally to color optical scanners and, more particularly to a single pass color optical scanner which employs a single linear sensor array.

Color optical scanners are similar to black and white optical scanners in that data representative of a scanned document (object) is produced by projecting an image of the scanned document onto optical sensors. The optical sensors produce data signals representative of the intensity of the light impinged thereon. These data signals are typically digitized and stored in appropriate data storage media. Such stored data may later be used, as for example through a personal computer and computer monitor, to produce a display image of the scanned object.

The image of the scanned object is projected onto the optical photosensor array incrementally by use of a moving scan line. The moving scan line is produced either by moving the document with respect to the scanner optical assembly or by moving the scanner optical assembly relative to the document.

Color optical scanners differ from black and white scanners in that multiple color component images of an object must be collected and stored to produce a color display image of the object. Typically data representative of red, green and blue component color images of the scanned object are produced and correlated for storage.

Various techniques are used in color optical scanners for collecting data representative of multiple component color images. One technique is to project imaging light onto a single linear sensor array during multiple scanning passes using differently colored illumination sources. For example a document is first scanned using only red light, then only green light and finally only blue light. In a variation of this technique three scanning passes are made using a white light illumination source but the imaging light is filtered before it enters the sensor array with a different color filter during each of the three passes. Such a technique is described in U.S. Pat. No. 5,122,911 of Kuo which is hereby specifically incorporated by reference for all that it describes.

Another technique, such as described in Vincent, U.S. Pat. No. 4,709,144 and Boyd, et al., U.S. Pat. No. 4,926,041, which are both hereby specifically incorporated by reference for all that is disclosed therein, is to split a polychromatic scan line light beam into multiple color component beams which are projected onto multiple linear photosensor arrays. For example an imaging beam from the same narrow scan line region of a document is split into red, green and blue component beams which are then simultaneously projected onto separate linear photosensor arrays. Using this technique the component color image data generated from any particular scan line is generated simultaneously and is thus easily stored in a correlated form.

Yet another technique for generating multiple color component images from a polychromatic light beam is to simultaneously project light from different scan line regions of a document onto separate linear photosensor arrays such as described in Takeuchi, R. et al. (1986) "Color Image Scanner with an RGB Linear Image Sensor," SPSE Conference, The Third International Congress On Advances in Non-Impact Printing Technologies, pp. 339-346, August 1986, which is hereby specifically incorporated by reference for all that it discloses. Using this technique it is necessary to perform data manipulation to correlate the data representative of different scan line component images since the different component color images of any scan line region of the document are generated at different times.

Various types of photosensor devices may be used in optical scanners. Currently the most commonly used photosensor device for optical scanners is the charge coupled photosensor device or "CCD". A CCD builds up an electrical charge in response to exposure to light. The size of the electrical charge built up is dependent on the intensity and the duration of the light exposure. In optical scanners CCD cells are aligned in linear arrays. Each cell or "pixel" has a portion of a scan line image impinged thereon as the scan line sweeps across the scanned object. The charge built up in each of the pixels is measured and discharged at regular "sampling intervals". In most modern optical scanners the sampling intervals of the CCD arrays are fixed. A typical CCD sampling interval is 4.5 milliseconds.

As previously mentioned an image of a scan line portion of a document is projected onto the scanners linear sensor array by scanner optics. The scanner optics comprise an imaging lens which typically reduces the size of the projected image from the original size of the document considerably. Pixels in a scanner linear photosensor array are aligned in a "cross" direction, i.e. a direction parallel to the longitudinal axis of the scan line image which is projected thereon. The direction perpendicular to the "cross" direction will be referred to herein as the "scan" direction. Each pixel has a "length" measured in the cross direction and a "width" measured in the scan direction. In most CCD arrays the length and width of the pixels are equal, e.g. 8 microns in each dimension. The "line width" of a linear CCD array is the same as the width of each of the individual pixels in the array.

At any instant when an object is being scanned, each pixel in the CCD array has a corresponding area on the object which is being imaged thereon. This corresponding area on the scanned object is referred to herein as an "object pixel" or simply "pixel". An area on a scanned object corresponding in area to the entire area of the linear sensor array is referred to herein as an "object scan line" or simply "scan line". An object scan line has the dimensions of the linear sensor array multiplied by the magnification ratio of the imaging lens. For descriptive purposes a scanned object is considered to have a series of fixed adjacently positioned scan lines.

Scanners are typically operated at a scan line sweep rate such that one scan line width is traversed during each CCD sampling interval.

SUMMARY OF THE INVENTION

The present invention is directed to an optical scanner having an imaging light path extending between a scan area on an object which is being scanned and an image plane. The scan area on the object includes a plurality of scan lines which are imaged onto the image plane. A single linear photosensor array is disposed on the image plane parallel to the imaged scan lines and generates a data signal representative of a scan line image which is impinged thereon. The photosensor array has a preset sampling interval. Relative movement between the object being imaged and the scanner optics causes the scan area to be swept across the object in a "scan direction" causing a corresponding sweep of scan line images over the linear photosensor array. The scan sweep speed may be one scan line per photosensor array sampling interval.

An elongated rotatable color wheel having an axis of rotation disposed transverse to the imaging light path is disposed in the imaging light path. The color wheel has a generally polygonal cross section with corresponding axially and circumferentially extending face portions. The face portions on one diametric half of the color wheel are identical filter plates. Each filter plate comprises circumferentially adjacent red, green and blue filter portions. The face portions on the other diametric half of the color wheel are open faces. The color wheel is rotated at a rate such that an arcuate distance associated with one filter plate is rotated every three photosensor sampling intervals. The color wheel is constructed and arranged with respect to the imaging light path such that a single face of the color wheel intersects the light path for a duration of three photosensor sampling intervals. The color wheel rotation is phased to the sensor sampling process and the color filter portions on each plate are constructed and arranged such that a single color filter portion intersects the light path during each photosensor sampling interval.

At the beginning of a first photosensor sampling interval the filter plate which intersects the imaging light beam is located at a first, oblique angle of incidence with the imaging light path. At a mid point in a second sampling interval the filter plate is located at a second, right angle of incidence to the light path. At the end of a third sampling interval the filter plate is located at a third, oblique angle of incidence with the light path. In one preferred embodiment of the invention the thickness of the plate and the index of refraction of the plate are selected so as to produce a relative shift of the scan image on the image plane of plus one scan line width at the first angle of incidence and minus one scan line width at the third angle of incidence. Due to the fact that the scan image is moving across the image plane at a rate of one scan line per sensor sampling interval, the above described rotation of the color wheel causes a single scan line to remain in registry with the linear photosensor array during the three successive sampling interval period in which one face of the color wheel intersects the light path. Thus the linear photosensor array generates a first data signal representative of a blue color component image of a first scan line during a first sensor sampling interval, then generates a second data signal representative of a green color component image of the first scan line during a second sensor sampling interval, then generates a third data signal representative of a red color component image of the first scan line during a third sensor sampling interval. During the period when the next plate portion of the color wheel intersects the light path, signals representative of blue, green and red color component images of the second scan line are generated, and so on.

Therefore, through use of the color wheel each scan line is "frozen" in registration with the linear photosensor array for three successive sampling intervals during which data representative of red, green and blue component images of the scan line are generated. The color wheel thus eliminates blurring associated with scan line movement over the linear photosensor. The color wheel also causes data representative of color component images of scan lines to be correlated in sequentially generated data sets. Further, the color wheel allows all of the information necessary to form a color image of an object to be generated in a single scan pass.

Those having skill in the art will appreciate that the colors on the filter plates could be arranged in a different order or different colors could be used or the color wheel could be constructed to accommodate greater or lesser number of color filter portions. Accordingly, in this more general case, the thickness and index of refraction of each plate are selected such that total relative shift of position of the imaged scan area on the image plane which is caused by varying the angle of incidence as the plate moves through the imaging light path is equal to one scan line width multiplied by one subtracted from the total number of different color filter portions on a plate.

BRIEF DESCRIPTION OF THE DRAWINGS

An illustrative and presently preferred embodiment of the invention is shown in the accompanying drawings in which.

DETAILED DESCRIPTION OF THE INVENTION

Figure 1:
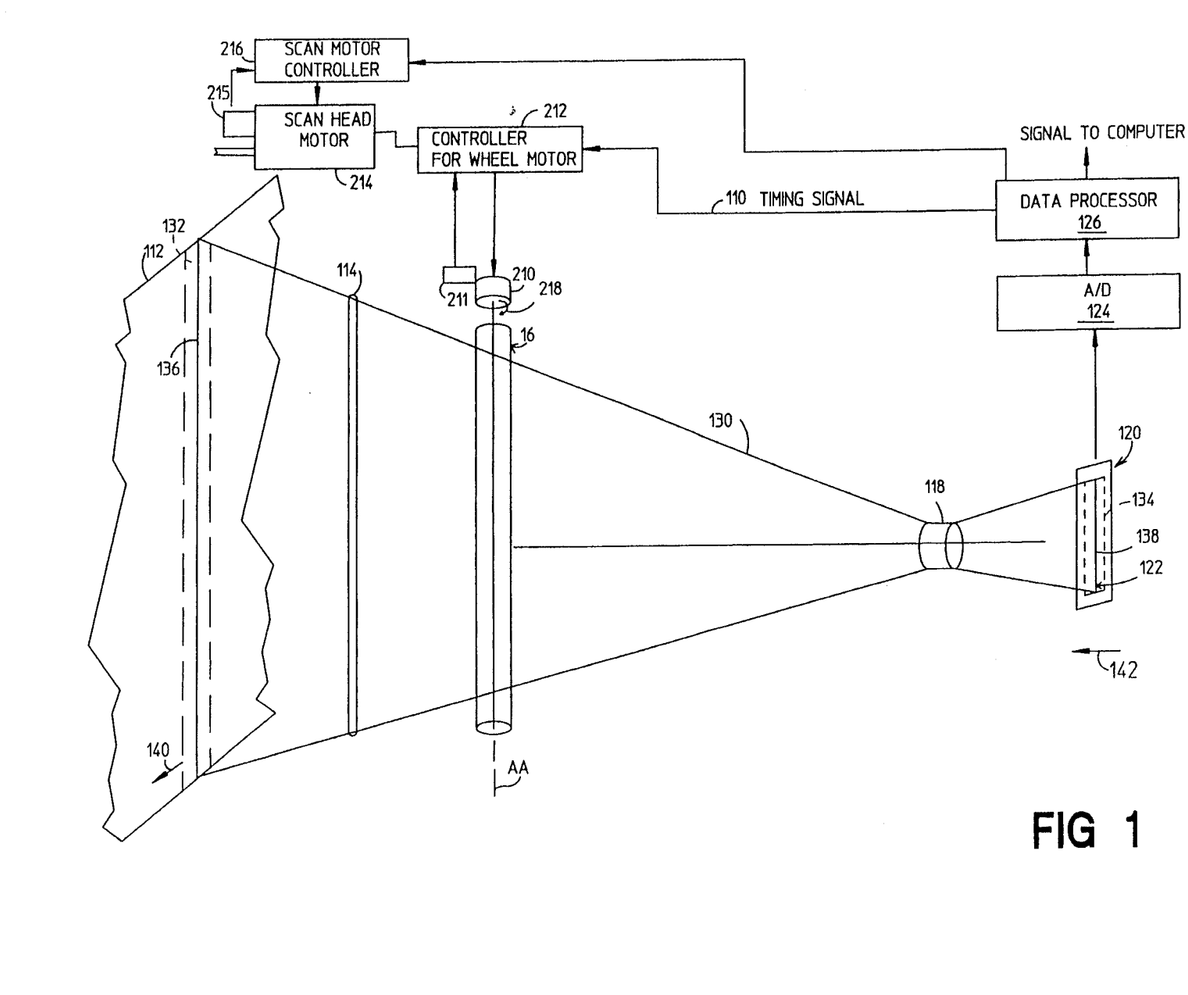
FIG. 1 is a schematic perspective view of a color scanner assembly.
Figure 7:
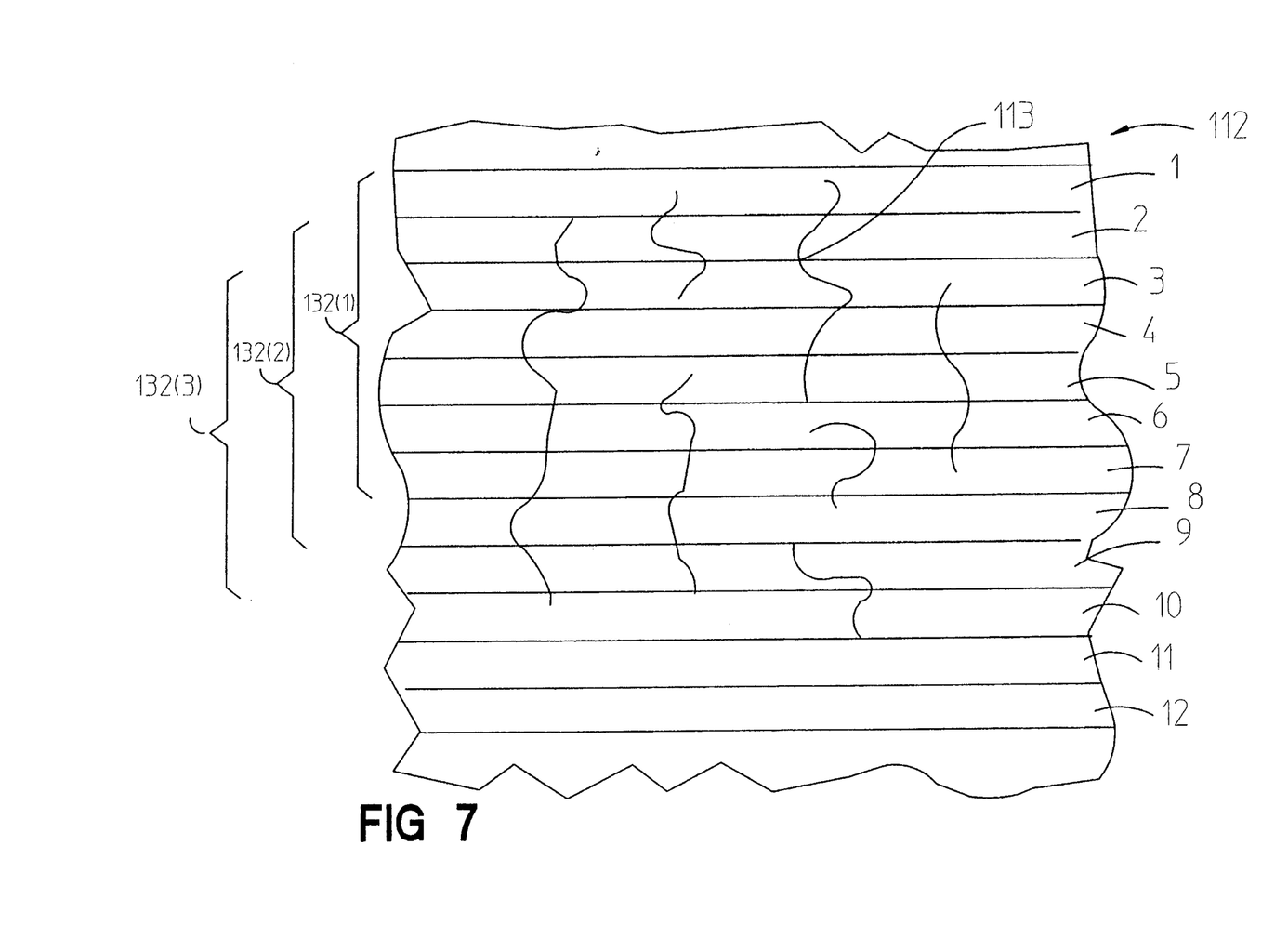
FIG. 7 is a plan view of a scanned object showing scan line portions thereof.

FIG. 1 schematically illustrates the major functional components of a color optical scanner 110. A scan object 112 such as a sheet of paper having graphics 113 thereon, FIG. 7, is supported on a transparent plate (not shown) for scanning by scanner 110. The scanner 110 comprises a light slit 114, a color wheel 116, an imaging lens assembly 118, and a linear photosensor unit 120 comprising a single linear photosensor array 122.

The photosensor unit generates a data signal representative of the intensity of light impinged on the linear photosensor array 122 at regular sampling intervals. The analog data signal from the linear photosensor unit is digitized by an A to D converter 124 and transmitted to a data processor 126 which transmits the signal in a predetermined conventional format to a computer for subsequent storage and/or use in producing a visual display as is well know in the art.

Figure 4:
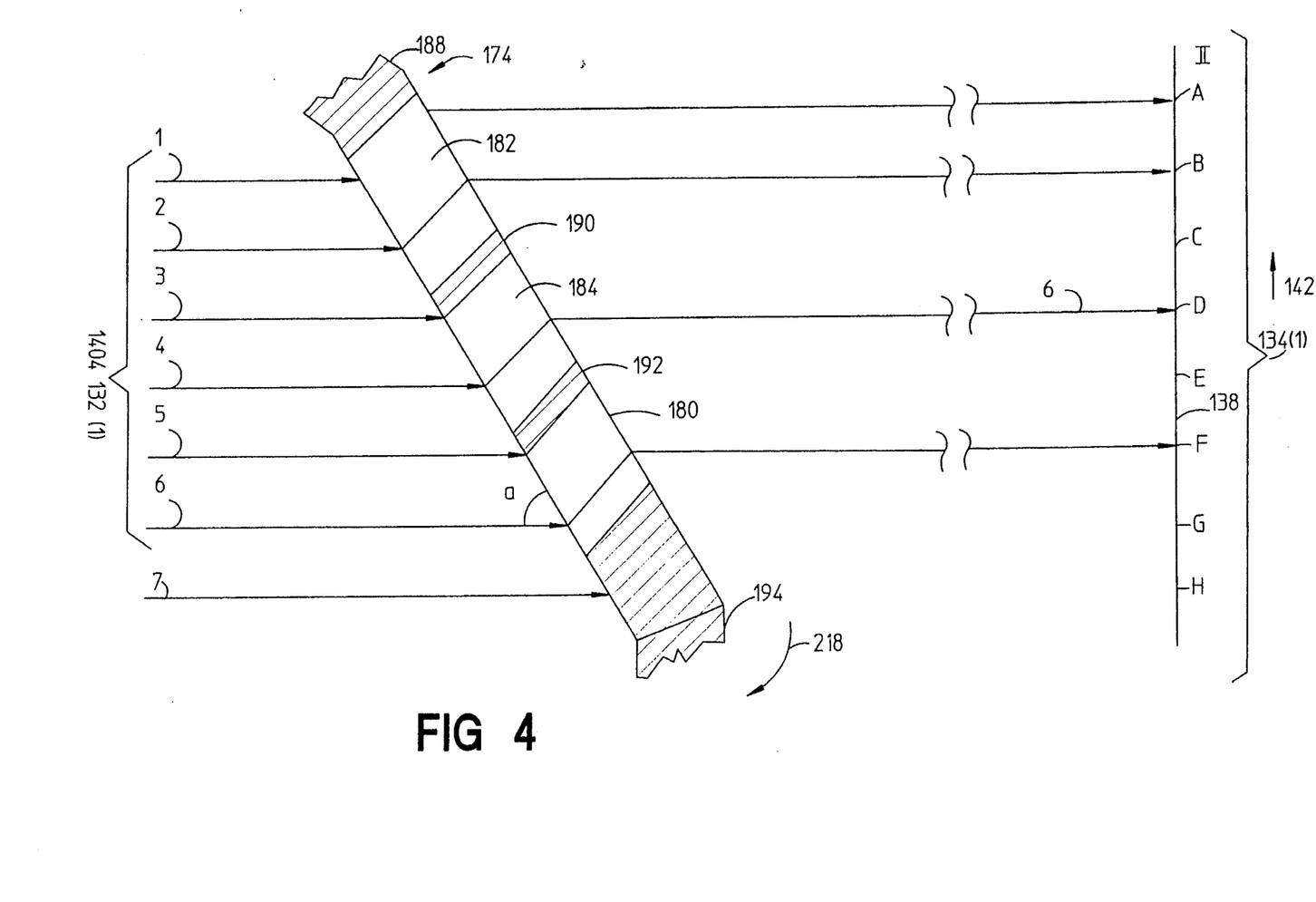
FIGS. 4, 5, and 6 are detail cross-sectional views showing relatively rotated positions of the color wheel face plate portion shown in FIG. 3 and illustrating a shift in the scan area image produced by such rotation.
Figure 5:
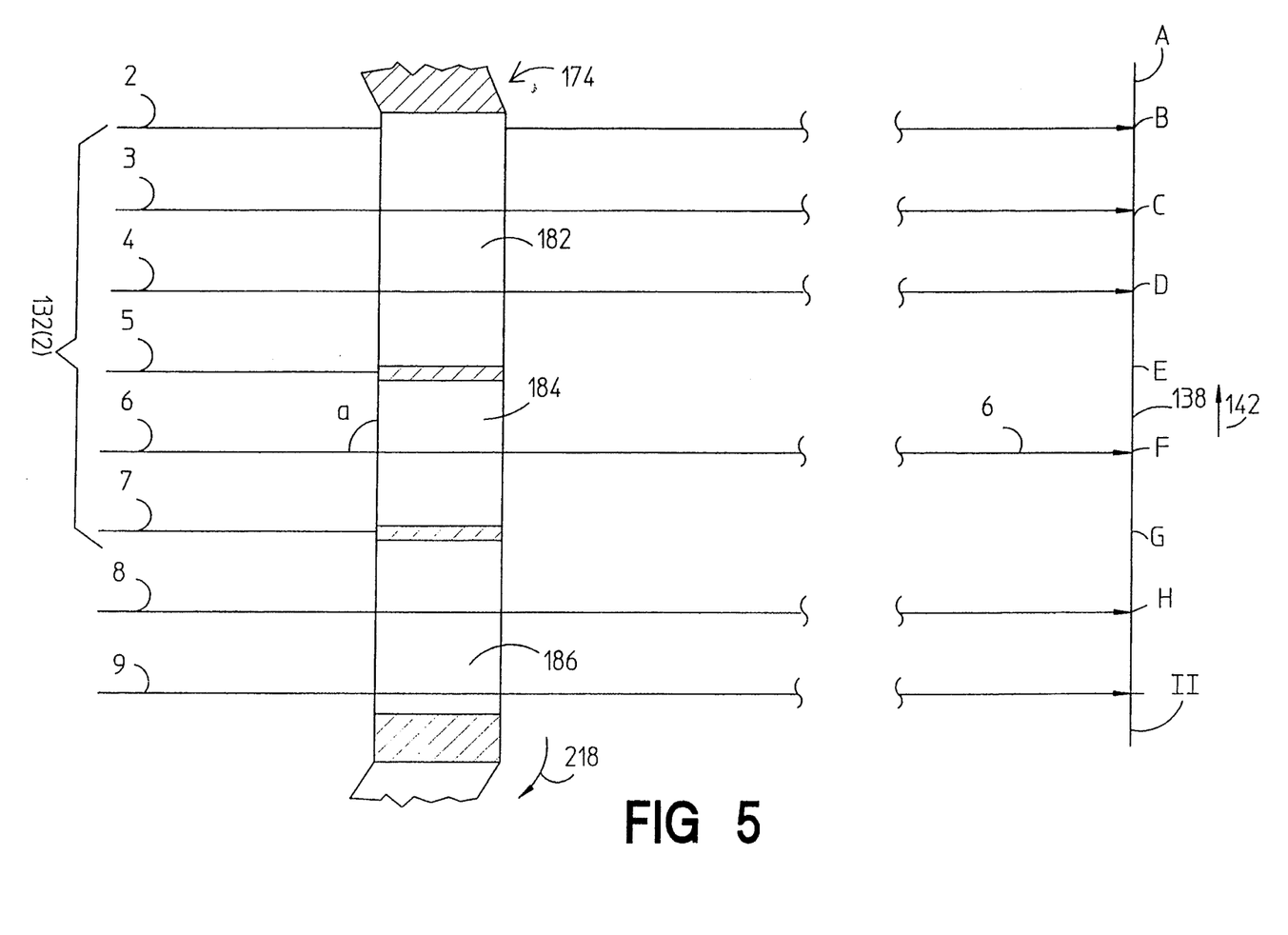
Figure 6:
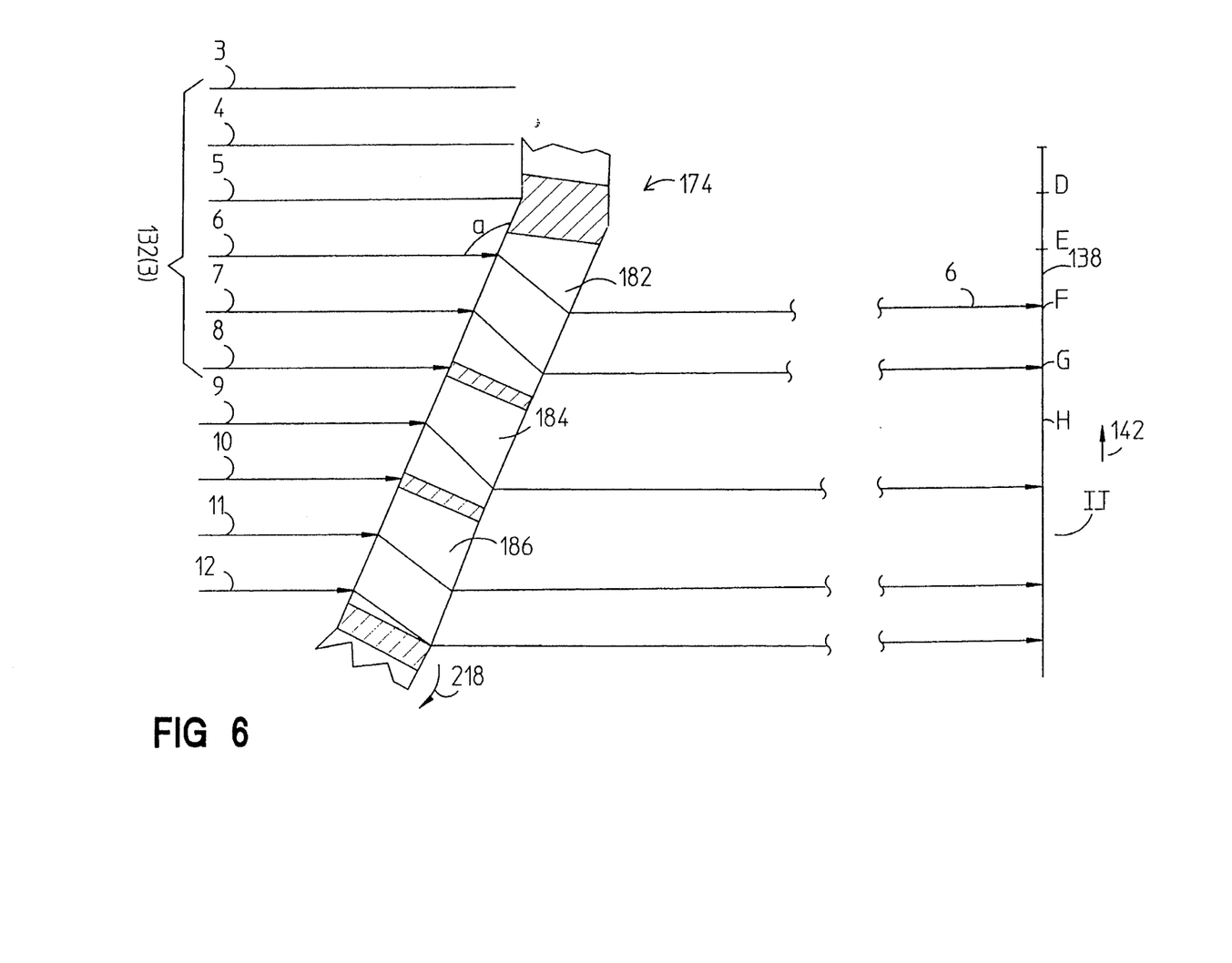

An imaging light path 130 (only the center plane of the light path is shown) extends from the scan area 132, through scan area defining slit 114 and imaging lens assembly 118 to an image plane II, FIGS. 4–6, corresponding to the face of linear photosensor unit 120. An image 134 of the scan area 132 is projected onto the image plane. The scan area 132 has a plurality of scan line portions 136 (only one scan line portion is shown in FIG. 1). Each scan line portion on the document has a width corresponding to the width of the linear photosensor array multiplied by the magnification ratio of the lens assembly 118. In the illustration of FIG. 1 an image 138 of scan line 136 is projected onto the image plane in registration with linear photosensor array 122. Thus linear photosensor array 122 during its current sampling interval would produce a data signal representative of scan line 136. The scan are 132 moves across document 112 in a scan direction 140 producing a corresponding movement of imaged scan lines in direction 142 on the image plane.

Figure 2:
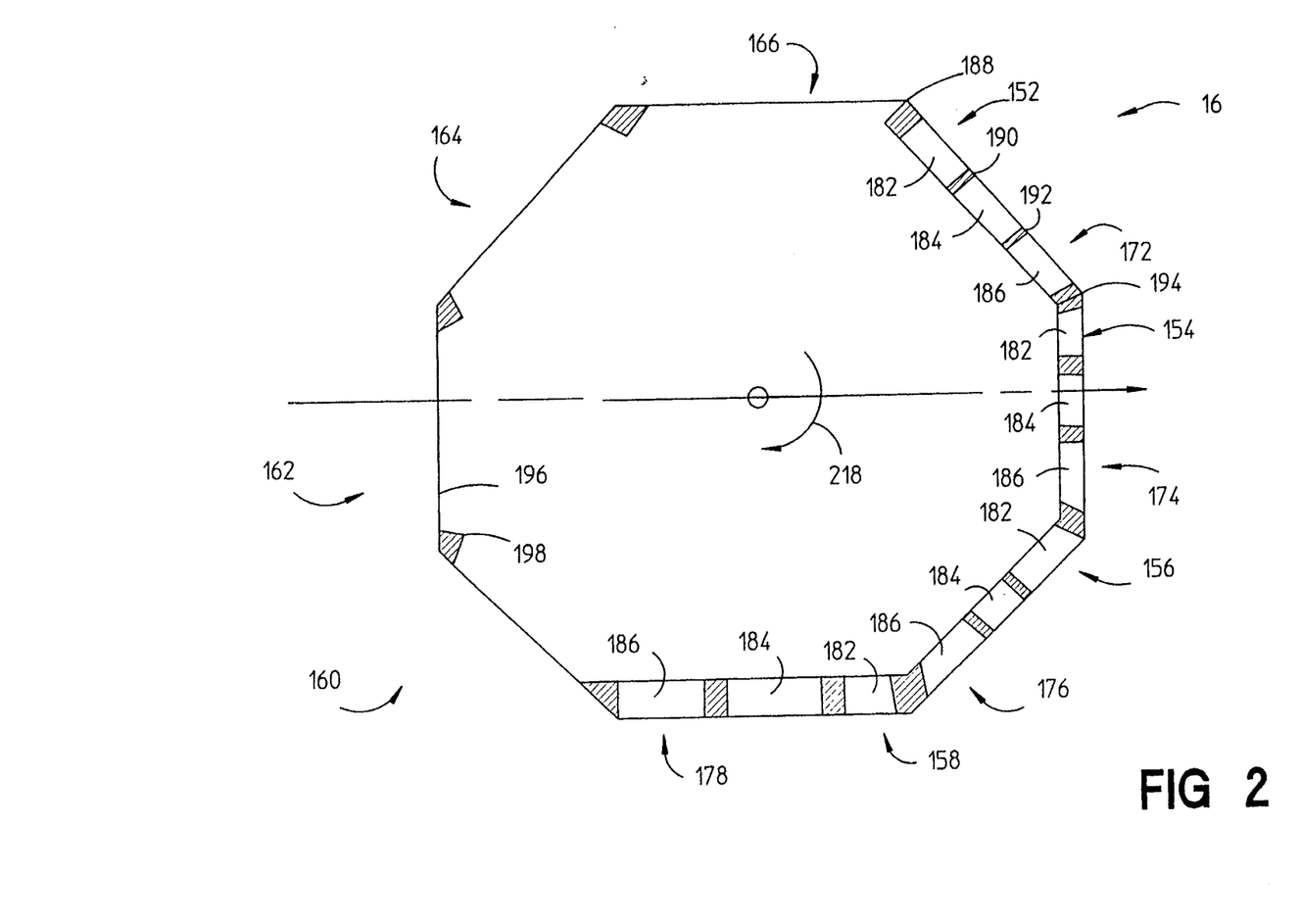
FIG. 2 is a cross-sectional side elevation view of a color wheel.
Figure 3:
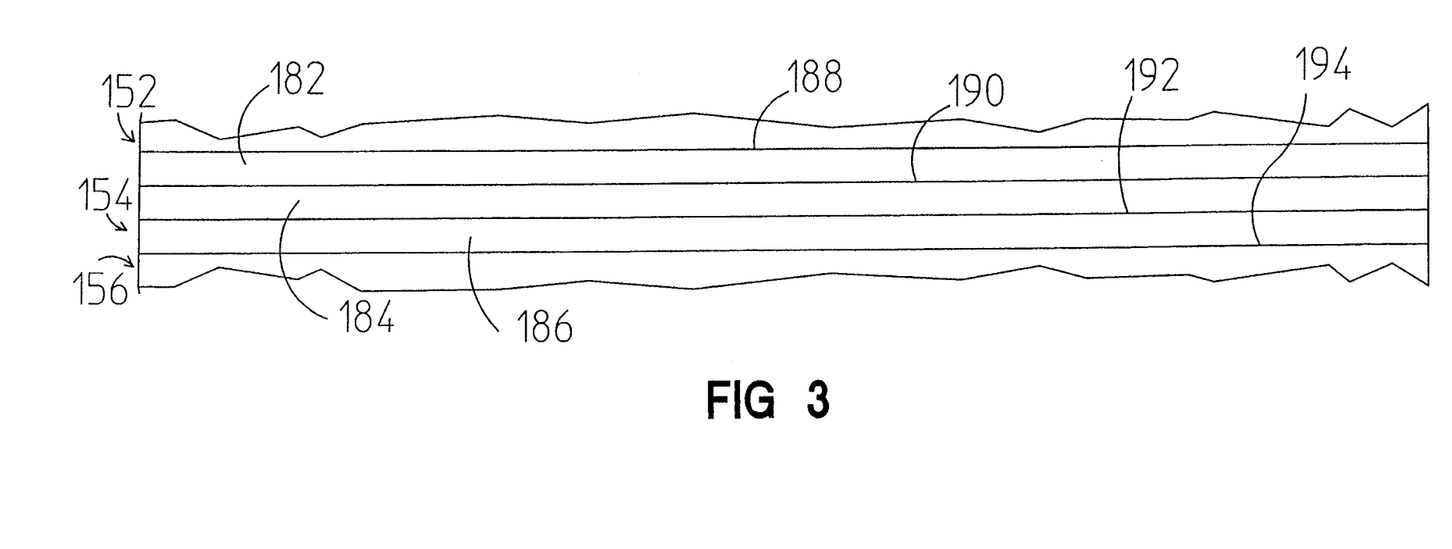
FIG. 3 is a detail elevation view of a face plate portion of color wheel 2.

A color wheel 152 with an axis of rotation AA extending transversely of the light path 130 has a generally polygonal cross sectional configuration as illustrated in FIG. 2. The color wheel comprises a plurality of axially and circumferentially extending faces 152, 154, 156, 158, 160, 162, 164, 166. Filter plates 172, 174, 176, 178, are positioned at the faces 152, 154, 156, 158 on one diametric half of the color wheel. Each filter plate comprises a red filter portion 182, a green filter portion 184, and a blue filter portion 186 which extend axially the full length of the color wheel as best shown in FIG. 3. The red, green and blue filter portion transmit only red, green, and blue light respectively. The filter portions on each plate are circumferentially separated from one another and from filter portions on adjacent plates by small opaque portions 188, 190, 192, 194 as best shown in FIGS. 3-6.

Faces 160, 162, 164, 166 on a second diametric half of the color wheel are open faces which allow unobstructed passage of light therethrough. However, peripheral structural members 196, etc. and counterweights 198 are provided so as to produce equal peripheral weighting of the color wheel to ensure smooth rotation.

As shown by FIG. 1 a color wheel motor 210 is provided with an absolute encoder 211 which produces a data signal representative of the relative rotated position of the color wheel at any particular point in time. This data signal is provided to a color wheel controller 212. The controller 212 also receives a timing signal from the photosensor data processor 126 which is representative of the occurrence of sampling intervals of the photosensor unit. The controller 212 sends a control signal to the color wheel motor 210 causing it to rotate at a predetermined speed in properly phased relationship with respect to the sampling operation of the linear photosensor array as discussed in greater detail below.

A scan head motor 214 having an absolute encoder 215 is used to produce relative motion of a scan line displacement assembly. The scan head motor is controlled by a scan motor controller 216 which may receive a data signal from photosensor data processor 126 indicative of the photosensor sampling frequency. The scan motor is controlled by the motor controller 216 to operate at a rate directly proportional to the photosensor sampling frequency. In one preferred embodiment of the invention the scan head motor is operated so as to produce a relative displacement between the scan object 112 and the scanner optics of one scan line per photosensor sampling interval. Various structures for producing relative motion between a scan object and scanner optics to sweep a scan area across an object are known in the art including apparatus for moving a document relative to stationary scanner optics, apparatus for moving scanner optics relative to a stationary document, and apparatus for displacing mirrors for reflecting imaging light from a stationary object into a stationary imaging assembly. It is to be understood that any of the known methods for producing relative displacement of a scan area across a document may be employed with the present invention. The conventional method of moving a pair of mirrors relative to a stationary document and a stationary imaging assembly is presently the best mode contemplated for performing this function in association with the color wheel of the present invention. In view of the fact that scan area displacement assemblies are well known in the art particular structure for achieving this result will not be further described herein.

The color wheel rotates about an axis AA disposed transversely with respect to light path 130 in a rotation direction 218. Prior to a scanning sweep the color wheel is accelerated up to a predetermined rotation rate which in one preferred embodiment is the speed necessary to displace an arcuate portion of the wheel containing one color filter plate e.g. 172 during three photosensor sampling intervals. Thus in the illustrated embodiment in which there are three color filter regions 182, 184, 186 on each plate and in which the plates are arranged in an octagonal configuration the rotation rate would be one rotation per 24 sampling intervals. The rotation of the wheel is also phased with respect to the operation of the photosensor array such that light which is imaged on the linear photosensor array passes through one and only one color filter portion during each sampling interval. Thus, for example, only blue light will be impinged on the linear photosensor during a first sampling interval, only green light during the following sampling interval, and only red light during the next following sampling interval, then, again, only blue light during the next sampling interval, and so on.

As is well-known in the optical arts, the relative lateral displacement "d" of the path of a light beam produced when a light beam strikes a plate having a thickness "x" and an index of refraction "N" at an angle "a" may be expressed by the equation $d = x[\tan(a) - \tan[\sin^{-1}(\sin(a)/N)]]/\cos(a)$. Thus, imaging light upon striking a filter plate, e.g. 154, will be relatively displaced on the image plane in the scan direction whenever the angle of incidence "a" is different than 90°. The maximum amount of displacement which occurs may be selected by choosing the number of sides in the polygonal structure of the wheel (and thus the maximum and minimum angle of incidence) and by selecting plate thickness and coefficient of refraction. FIG. 4 illustrates that, during initial rotation of a plate, e.g. 174, into intersecting relationship with the imaging light beam, the image on the image plane II will be relatively shifted in image plane scan direction 142. The maximum amount of image shifting will occur at the beginning and at the end of the period of time that a particular plate, e.g. 174, intersects light path 130 with no shifting occurring at the point when the plate 174 is aligned perpendicular with the light path.

FIG. 4 illustrates a position of the color wheel at which plate 174 has intersected light from a scan area 132 which currently includes scan lines 1-6 shown in FIG. 7. The lines 1-6 indicated in FIG. 4 represent the centerline of the imaging light cone projected from scan lines 1-6 shown in FIG. 7. As may be seen from FIG. 4, but for the fact of light refraction produced by plate 174, scan lines 1, 2, 3, 4, 5, 6 would be aligned with fixed lines B, C, D, E, F, G respectively, on image plane II. However, due to the refraction, the imaging light is shifted up one scan line width on the image plane such that scan lines 1, 2, 3, 4, 5, 6 are aligned with image plane lines A, B, C, D, E, F. Scan line 6 in FIG. 4 is through this refractory displacement positioned in registration with the linear photosensor array 138 positioned at fixed image plane line F. At the position of movement illustrated in FIG. 4 scan line 6 passes only through blue filter region 186 and thus the linear photosensor array 138 has only blue light impinged thereon.

FIG. 5 illustrates the position of plate 174 after it has rotated from the position of FIG. 4 to an orientation perpendicular to the imaging light path. In the position illustrated in FIG. 5 plate 174 causes no refractory shift of the light from the scan lines. However due to the movement of the scan area from 132(1) to 132(2), scan lines 2, 3, 4, 5, 6, 7 are now directly aligned with image plane lines B, C, D, E, F, G, H. Thus light from scan line 6 remains in registration with the linear photosensor 138 located at position F on image plan II in spite of the relative movement of the object scan lines due to scan area movement. In FIG. 5 light from scan line 6 passes only through green filter region 184 and thus the photosensor 138 has only green light impinged thereon.

FIG. 6 shows the filter plate 174 at a further rotated position whereat incident light beams in the imaging light path strike plate 174 at an obtuse angle a. In FIG. 6 the scan area has again moved one scan line width such that light from scan line 7 would be impinged upon photosensor 138 if not for the refraction caused by the plate. As a result of the refraction caused by plate 174 the scan line image is shifted one scan line width downwardly, i.e. in the direction opposite 142, such that scan line 6 remains in registration with photosensor 138. It may also be seen from FIG. 6 that as a result of the movement of the scan area 132 to position 132 (3) and the relative movement of plate 174 in rotation direction 218 that scan line 6 now passes through red filter area 182 such that only red imaging light is impinged on linear photosensor array 138.

It will be appreciated from the above description that as the color wheel 16 rotates a single scan line, e.g. 6, will be "frozen" in registration with the linear photosensor array 138 during the entire period when light passing through plate 174 is imaged on photosensor 138. This result is accomplished due to the fact that the shifting motion of the scan line image which would ordinarily be expected as a result of scan area displacement on the object is compensated for by shifting displacement of the scan area image caused by the relative angular displacement of plate 174 with respect to the imaging light path. It is also to be understood that the color wheel is phased with respect the sampling intervals of the linear photosensor array such that during each sampling interval light from only one of the three different filter portions is impinged on the linear photosensor array. Thus data representative of first a blue component image, then a green component image, then a red component image of scan line 6 is produced during the three sampling intervals in which scan line 6 is impinged on photosensor 138. In order to prevent light which impinges on the linear photosensor 138 from passing through more than one filter portion, opaque portions 188, 190, 192, 194 are provided between the regions 182, 184, 186, and at the ends of plate 174.

It will also be appreciated from the above that as plate 174 rotates past the position illustrated in FIG. 6 that the next plate 172 will initially assume the approximate position of plate 174 in FIG. 4 and will at that time cause a shift in the scan line which is registered with linear photosensor 138, i.e. scan line 7 will be placed in registration with linear photosensor array 138 replacing scan line 6. After plate 172 has completed its passage through the imaging light beam plate 178 will enter into intersecting relationship with the imaging light beam to again cause a one scan line shift in the scan line which is registered with the photosensor. Plate 178 will have the imaging beam from the scan area incident on its radially outer surface as it rotates upwardly through the imaging light beam. However, the scan line shifting operation and color filtering operations which it performs will be identical to those described above when the imaging beam was incident on the radially inner surface of a filter plate.

In this manner each scan line on the document has its image maintained in registration with the linear photosensor array 138 for three consecutive sampling intervals during which a blue, green and red color component image of the scan line are generated.

While illustrative and presently preferred embodiments of the invention have been described in detail herein, it is to be understood that the inventive concepts may be otherwise variously embodied and employed and that the appended claims are intended to be construed to include such variations except insofar as limited by the prior art.

What is claimed is:

1. A color optical scanner for generating data representative of a color image of an object which is scanned comprising:
   a) a linear sensor array located on an image plane for generating a data signal indicative of the intensity of light impinged thereon and having a sensor sampling interval of a predetermined length;
   b) imaging means for imaging a moving scan area on said object containing a plurality of scan lines on an image plane and for defining an imaging light path extending from said scan area on said object to said image plane;
   c) color wheel means disposed between said object and said image plane along said imaging light path and having an axis of rotation extending transversely of said light path and having a peripheral portion comprising a plurality of filter portions of different spectral range transmissibility which are sequentially rotated into intersecting relationship with said imaging light path during different color imaging intervals having durations equal to said sensor sampling interval.

2. The invention of claim 1 said color wheel means being constructed and arranged for shifting the portion of said moving scan area which is registered with said linear sensor means by differing amounts dependent upon the rotational position of said color wheel means relative to said imaging light path.

3. The invention of claim 2, said peripheral portion of said color wheel means comprising a plurality of faces containing said plurality of filter portions at least a first half of said color wheel means having a half regular polygon cross-sectional shape, said plurality of faces containing said filter portions being positioned in adjacent relationship around said first half of said color wheel means, a second half of said color wheel means comprising open faces.

4. The invention of claim 3 comprising:
   color wheel drive means drivingly connected to said color wheel means for rotating said color wheel means at an angular velocity directly proportional to the frequency of sensor sampling intervals and inversely proportional to the number of faces on said first half of said color wheel means.

5. The invention of claim 4 wherein the number of faces on said first half of said color wheel means, the thickness of said filter portions and the index of refraction of said filter portions are selected such that the same single scan line region of said object is imaged on said linear sensor means during consecutive color imaging intervals.

6. A method of generating data signals representative of a color image of an object comprising the steps of:

imaging a scan area of the object on an image plane containing a linear photosensor array having a preset sampling interval;

relatively moving the scan area across the object at a scan rate;

sequentially moving a series of plates having multiple color filter portions and having a predetermined plate thickness and predetermined index of refraction through an imaging light path at a predetermined rate; and continuously varying the angle of incidence between each plate and the imaging light path as each plate is moved through the light path so as to continuously shift the image of the scan area which is projected on the image plane.

7. The invention of claim 6 wherein the series of plates are mounted in a substantially polygonal configuration on the periphery of a wheel and wherein said steps of sequentially moving the series of plates and continuously varying the angle of incidence between each plate and the imaging light path are performed by rotating the wheel.

8. The invention of claim 7 wherein said step of rotating the wheel comprises rotating the wheel at a rate dependent on the preset sampling interval of the linear photosensor array.

9. The invention of claim 8 wherein said step of relatively moving the scan area across the object at a scan rate comprises moving the scan area at a scan rate dependent on the sampling interval of the linear photosensor array.

10. The invention of claim 9 wherein the step of rotating the wheel comprises rotating the wheel at a rate such that a single plate is intersected by a portion of the light path imaged on the photosensor array during a period of time equal to the number of color filter portions on the plate multiplied by the sampling interval of the photosensor array.

11. The invention of claim 10 comprising phasing the wheel with the sampling interval of the photosensor array such that a different color filter portion of the plate currently intersecting the imaging light path is in registration with the portion of the light path being imaged on the linear photosensor array during each sampling interval of the linear photosensor array.

12. The invention of claim 11 wherein said step of relatively moving the scan area across the object at a scan rate comprises moving the scan area at a scan rate equal to one scan line per sampling interval of the linear photosensor array.

13. The invention of claim 12 comprising selecting the thickness and index of refraction of each plate such that the total relative shift of position of the imaged scan area on the image plane which is caused by the varying angle of incidence as a plate moves through the imaging light path is equal to one scan line width multiplied by one subtracted from the total number of different color filter portions on a plate.

* * * * *